Dec. 18, 1928.
R. L. COTTERILL
DISHWASHER
Filed July 2, 1927
1,695,412
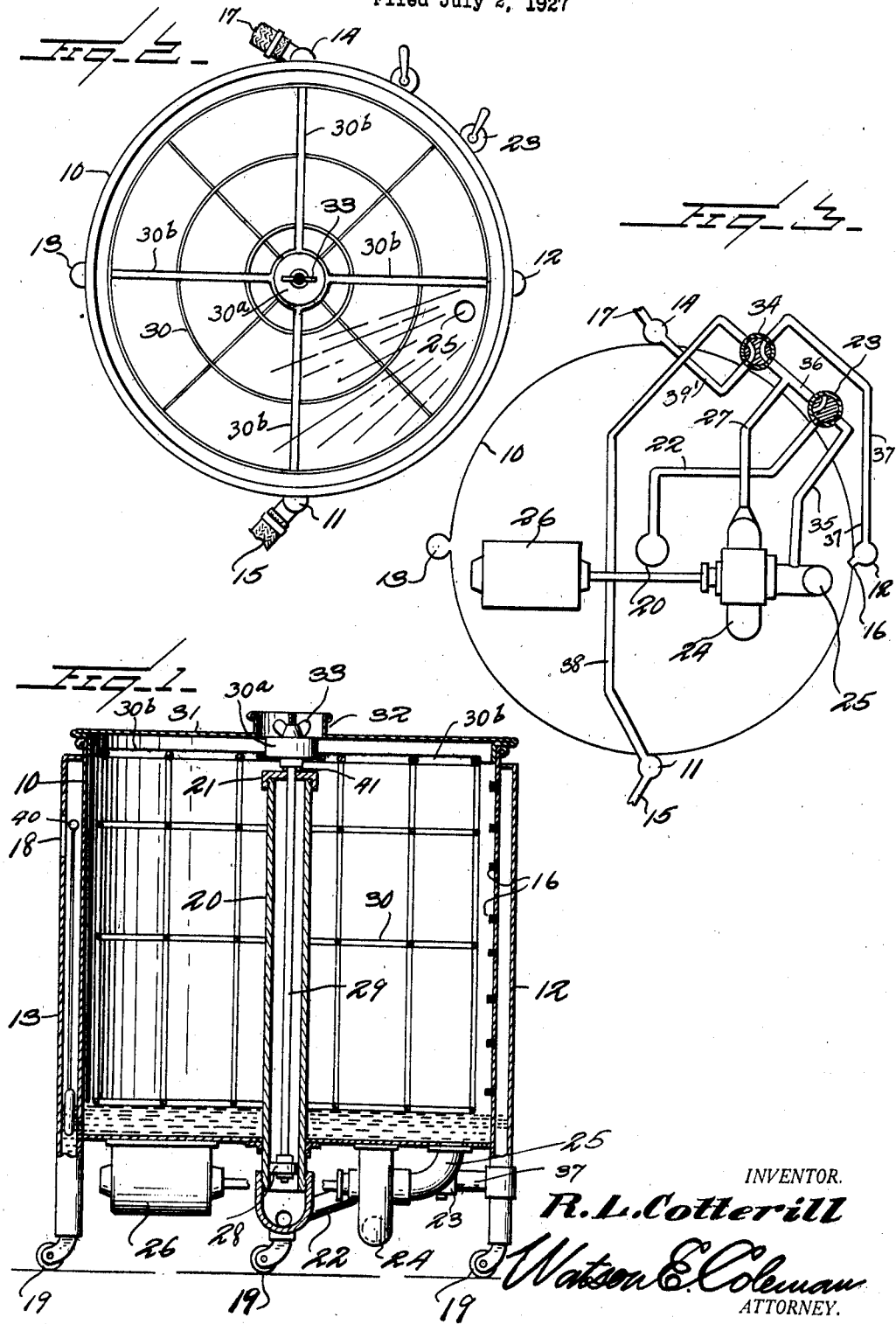
INVENTOR.
R. L. Cotterill
Watson E. Coleman
ATTORNEY.

Patented Dec. 18, 1928.

1,695,412

UNITED STATES PATENT OFFICE.

ROBERT L. COTTERILL, OF PHILADELPHIA, PENNSYLVANIA.

DISHWASHER.

Application filed July 2, 1927. Serial No. 203,146.

This invention relates to dish washing machines, and the general object of the invention is to provide a particularly effective dish washing machine in which the dishes are supported within an openwork rack, the rack being normally disposed within an outer tub or tank, and means being provided for giving the rack a rotary movement by the discharge of water tangentially against the rack full of dishes.

A further object is to provide means whereby the rack may be hydraulically lifted out of the tank when desired and held in this lifted position by water pressure.

A still further object is to provide means whereby water may be drawn by the pump from the tank and discharged through tangentially directed spray nozzles or discharged through an outlet pipe to empty the tank and whereby the discharge of water may be manually controlled.

My invention is illustrated in the accompanying drawing, wherein:—

Figure 1 is a vertical sectional view of my improved washing machine;

Figure 2 is a top plan view thereof;

Figure 3 is a diagrammatic bottom plan view showing the piping arrangement.

Referring to this drawing, 10 designates a tank which may be made of sheet metal or of any other suitable material and which is shown as supported by four hollow posts 11, 12, 13 and 14. The post 11 constitutes a hollow leg through which water may be fed into the tank by means of the pipe 15; the hollow leg 12 is formed with a plurality of tangentially directed spray nozzles or outlets 16, the hollow leg 14 is connected to a discharge pipe 17 for emptying the washer, and the hollow leg 13 is connected at its lower end to the tank so that the water column within the hollow leg will be the same height as the water column within the tank and at its upper end this hollow leg 13 is provided with the float gauge glass 18. The lower ends of these hollow legs are provided with the casters 19 upon which the machine is supported and by which it may be shifted from one point to another.

Extending upward through the bottom of the tank 10 is a hydraulic cylinder 20 having a cap 21 at its upper end and at its lower end operatively connected, as by a pipe 22, to a valve 23. This valve 23 controls the passage of water either from or to the cylinder 20. Mounted upon the bottom of the tank is a pump 24 which receives water from a pipe 25 which opens through the bottom of the tank and this pump is driven by means of an electric motor 26. The pump is shown as a centrifugal pump but I do not wish to be limited to this. The pump is connected by a pipe 27 and pipe 36 to a valve 34 and by means of this valve 34 the water may be directed either up through the leg 12 and out through the openings 16. By closing the valve 34 and opening valve 23 to connect pipes 36 and 22, the water may be discharged into the lower end of the cylinder 20 to thus raise the piston therein.

Disposed within the cylinder 20 is a piston 28 having a piston rod 29 which extends up through the cylinder and through the cap 21. This piston rod at its upper end rotatably and detachably supports the cage or rack of openwork construction made preferably of wire or rods and designated 30. As illustrated in Figure 1, the piston rod carries upon it a nut or equivalent member 41 and this supports a head 30ª through which the piston rod 29 passes, the piston rod being clamped to this head by means of the wing nut 33. When this wing nut 33 is removed, the head 30ª may be removed from the piston rod. Transverse supports 30ᵇ extend diametrically across the cage at the top thereof and are operatively engaged with the head 30ª so as to support the cage upon the head. The head 30ª is intended to be permanently engaged with these rods 30ᵇ. Obviously, I do not wish to be limited to this particular construction as other means for supporting the rack from the head 30ª might be used. This rack is circular in form to conform to the tank and, while it may be of any suitable construction, is illustrated as formed of circumferentially extending rods and vertically and horizontally extending rods joined at their intersections. This rack is open at the top for the insertion of dishes and the rods forming the rack are so closely placed together as to support dishes properly within the rack while they are being whirled around through the water. A lid 31 is adapted to fit down within the top of the tank to close the same, the lid being formed with a protuberant portion 32 at its middle which accommodates the wing nut 33 which engages the rack with the piston rod.

While I do not wish to be limited to any particular piping system or valve control for the piping system, I have illustrated in Figure 3 a diagrammatic view of a piping system whereby the several operations heretofore referred to can take place. The passage of water from the pump through the sprayer or out of the tank or to discharge water into the tank and the discharge of water into or out from the cylinder 20 is controlled by the valve 23 and a second valve 34. The valve 34 is a four-way valve, while the valve 23 is a three-way valve. These valves are operated by the usual handles. The valve 23 is connected by a pipe 35 to the inlet end of the pump and as, before stated, is connected by the pipe 22 to the cylinder 20. The pipe 27 which discharges from the pump is connected to a branch pipe 36 which connects to valve 23 and to valve 34. From valve 34 extends a pipe 37 to the spray leg or column 12. From the inlet leg or column 11 extends a pipe 38 which extends to the valve casing by valve 34 and from this valve casing extends the outlet pipe or discharge pipe 39 extending to the outlet leg 14.

In the operation of this dish washer, it is designed that the rack shall be filled with dishes and that the water shall be approximately at the level shown in Figure 1. First assuming that there is a small quantity of water in the tank sufficient to operate the hoist, then the valve 34 is placed in the off position and valve 23 in the hoist position. The pump is then started by closing the switch which connects it to the source of energy and the water will flow from the pump, pipe 27, branch 36, valve 23, and pipe 22 to the cylinder 20, raising the rack. When the rack is completely out of the tank, the valve 23 is turned to its off position and the pump is stopped, and the water in the cylinder now having no escape will maintain the rack in its elevated position. The pump being a centrifugal pump can operate for a short time without any outlet, but it is better to stop it when not needed.

The dishes are placed in the rack in the places provided according to the size of the various dishes and, if possible, evenly distributed around the rack. The rack is then lowered into the tank by placing valve 23 in its lowering position. Water will then be forced by the weight of the rack through the cylinder 20, through pipe 22 and pipe 35 back into the tank through the pipe 25. It is thus not necessary to start the pump in order to lower the rack. The hose pipe 15 is connected to a hot water spigot and the hose pipe 17 is connected to discharge with a sink or other drain. When the valve 34 is placed in discharge position, the water will flow from the spigot through hose 15, leg 11, pipe 38, valve 34, pipe 37, leg 12 and into the tank through the spray nozzles. The tank is filled with water until the float indicator 40 appears in the opening 18 of the leg 13.

Soap is added to the water, the lid is placed in position and the dishes washed by placing the valve 34 in the spray position, starting the pump, and having the valve 23 in its off position. Water will flow from the tank through pipe 25 to the pump and thence through pipes 27, 36, the valve 34 and pipe 37 to the spray nozzles.

If the supply spigot should inadvertently be left open while the valve 34 is in its spray discharging position, water from the spigot will pass through pipe 15, leg 11, pipe 38, pipe 39 and out to the sink. After the dishes have been washed sufficiently, the valve 34 is turned to discharge position, with the pump still running, draining the water from the tank through pipe 25 to the pump, thence to pipe 27, to valve 34 and out through pipe 39 to the sink or drain. The pump is then stopped and by means heretofore described the tank is sufficiently filled with the rinsing water, leaving the valve 34 in its discharge position. The pump is then started with the valve 34 in its spray position and the dishes are rinsed, then the valve 34 is turned to its off position, the lid of the tank is removed, the valve 23 is placed in its rack-hoisting position, and the rack is hoisted until the contents are clear of the tank. The motor is then stopped, with the valve 23 in its off position and the dishes removed from the rack. The whole operation may be very quickly and easily performed.

While I have illustrated certain details of construction and arrangement of parts, I do not wish to be limited to this as it is obvious that many changes might be made within the scope of the appended claims without departing from the spirit of the invention.

I claim:—

1. A washing machine including a tank, the tank being formed to provide a water inlet leg at one point, having nozzles uniformly spaced in a vertical series on said leg and discharging tangentially with relation to the tank, a rack rotatably mounted within the tank, and valve means whereby the passage of water from the nozzles and through the tank may be controlled.

2. A washing machine of the character described including a tank, a piston rod extending upward through the center of the tank, a piston thereon, a cylinder within which the piston operates, a pump having an inlet connection to the cylinder, a rack rotatably mounted upon the upper end of the piston and vertically movable with the piston but rotatable independently thereof, means connected to the pump whereby water may be discharged against objects supported in said rack, and means for directing water from the pump either into the lower end of the cylinder beneath the piston thereof or into said water discharging means.

3. A washing machine of the character described including a tank, a rack rotatably mounted within the tank, a piston rod and piston supporting the rack for rotation or vertical movement, a cylinder within which the piston rod operates, a pump having an inlet connection to the interior of the tank, a pipe having tangential nozzles discharging through one side wall of the tank toward the rack, and means for directing water from the pump either into the lower end of the cylinder beneath the piston thereof or into said nozzles.

4. A washing machine of the character described including a tank, a cylinder extending upward through the bottom of the tank nearly to the top thereof, a piston mounted within the cylinder and having a piston rod extending through the top of the cylinder, a rack rotatably mounted upon said piston rod, a pump having an inlet connection leading to the tank, a pipe extending upward along the tank and having jets discharging tangentially thereinto, and means for directing water from the pump either into the lower end of the cylinder or into said pipe.

5. A washing machine of the character described including a tank having a plurality of hollow legs, one of said legs being connected to a water inlet connection and the other to a water outlet connection, another of said legs having a plurality of tangentially extending jet nozzles discharging into the interior of the tank, and another of said legs having a water gauge, a cylinder extending upward through the bottom of the tank and terminating adjacent the top thereof, a piston disposed in the cylinder and having a piston rod extending through the top of the cylinder, a rack rotatably mounted upon the piston rod and normally operating within the cylinder, a pump mounted upon the bottom of the tank and having an inlet pipe leading through the bottom of the tank to the pump, a motor for driving the pump also mounted upon the tank, and a valve operatively connecting the outlet from the pump either to said spray pipe or to the lower end of the cylinder.

In testimony whereof I hereunto affix my signature.

ROBERT L. COTTERILL.